United States Patent
Whitney et al.

(10) Patent No.: US 9,096,210 B2
(45) Date of Patent: Aug. 4, 2015

(54) COORDINATION OF FUEL CUTOFF FOR FAULT DETECTION AND HYBRID OPERATION

(75) Inventors: Christopher E. Whitney, Commerce, MI (US); Anthony H. Heap, Ann Arbor, MI (US); John W. Siekkinen, Novi, MI (US); Michael John Dokter, Okemos, MI (US); Stephen Paul Levijoki, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 725 days.

(21) Appl. No.: 13/412,002

(22) Filed: Mar. 5, 2012

(65) Prior Publication Data

US 2013/0184907 A1 Jul. 18, 2013

Related U.S. Application Data

(60) Provisional application No. 61/585,811, filed on Jan. 12, 2012.

(51) Int. Cl.
*B60W 20/00* (2006.01)
*B60W 10/06* (2006.01)
*B60W 10/08* (2006.01)

(52) U.S. Cl.
CPC ............... *B60W 10/06* (2013.01); *B60W 10/08* (2013.01); *B60W 20/00* (2013.01); *B60W 20/1082* (2013.01); *B60Y 2300/46* (2013.01); *B60Y 2300/65* (2013.01); *Y02T 10/6286* (2013.01)

(58) Field of Classification Search
CPC ..... B60W 10/06; B60W 10/08; B60W 20/00; B60W 20/1082; B60Y 2300/46; B60Y 2300/65; Y02T 10/6286
USPC .............. 701/34.3, 46, 22; 340/426.1, 426.22
See application file for complete search history.

(56) References Cited

U.S. PATENT DOCUMENTS 7,933,711 B1 * 4/2011 Ulrey et al. .................... 701/112

* cited by examiner

*Primary Examiner* — Mary Cheung
*Assistant Examiner* — Yuen Wong

(57) ABSTRACT

A monitoring module selectively generates a request to at least one of: transition from providing rich fueling an engine to operating the engine in a fuel cutoff (FCO) state; and transition from operating the engine in the FCO state to providing rich fueling to the engine. In response to a response to the request, the monitoring module: selectively controls fueling to the engine to perform the at least one of the transitions; and selectively determines whether a fault is present in a component based on a response to the at least one of the transitions. A hybrid control module controls an electric motor of the hybrid vehicle and that selectively generates the response.

20 Claims, 7 Drawing Sheets

COORDINATION OF FUEL CUTOFF FOR FAULT DETECTION AND HYBRID OPERATION

CROSS-REFERENCE TO RELATED APPLICATIONS

This application claims the benefit of U.S. Provisional Application No. 61/585,811, filed on Jan. 12, 2012. The disclosure of the above application is incorporated herein by reference in its entirety.

FIELD

The present disclosure relates to control systems and methods for hybrid vehicles and more particularly to fuel cutoff control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A monitoring module selectively generates a request to at least one of: transition from providing rich fueling an engine to operating the engine in a fuel cutoff (FCO) state; and transition from operating the engine in the FCO state to providing rich fueling to the engine. In response to a response to the request, the monitoring module: selectively controls fueling to the engine to perform the at least one of the transitions; and selectively determines whether a fault is present in a component based on a response to the at least one of the transitions. A hybrid control module controls an electric motor of the hybrid vehicle and that selectively generates the response.

A control method for a hybrid vehicle includes: (i) selectively generating a request to at least one of: (a) transition from providing rich fueling an engine to operating the engine in a fuel cutoff (FCO) state; and (b) transition from operating the engine in the FCO state to providing rich fueling to the engine; (ii) in response to a response to the request: (a) selectively controlling fueling to the engine to perform the at least one of the transitions; and (b) selectively determining whether a fault is present in a component based on a response to the at least one of the transitions; controlling an electric motor of the hybrid vehicle using a hybrid control module; and selectively generating the response using the hybrid control module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Hybrid vehicles include an internal combustion engine and one or more electric motors or motor generator units. Under some circumstances, delivery of fuel to the engine can be cut off. For example, fuel can be cut off during deceleration to avoid unnecessary fuel consumption during the deceleration. While the fuel is cut off, the electric motor(s) may supply torque to propel the vehicle, convert mechanical energy into electrical energy for use and/or storage, and/or perform other functions.

Fuel may also be cut off for a determination of whether a fault is present in a component. For example only, a response of an exhaust gas oxygen sensor to one or more transitions from rich fueling to lean fueling and/or vice versa may be monitored to determine whether a fault is present in the exhaust gas oxygen sensor. The lean fueling may be accomplished by cutting off fuel to the engine while air is pumped through the engine as the engine spins.

Figure 1A:
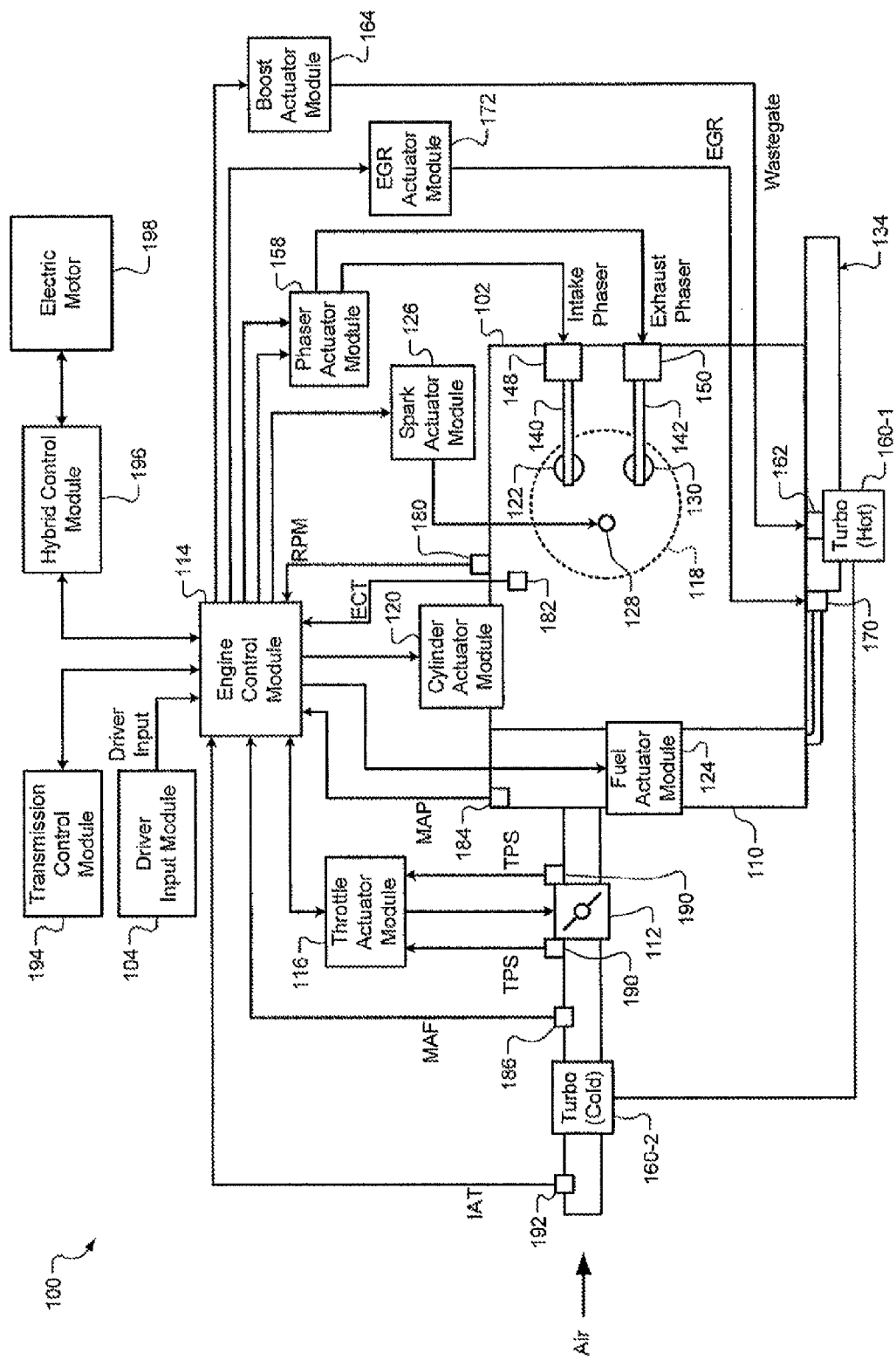
FIGS. 1A-B include functional block diagrams of an example hybrid vehicle system according to the principles of the present disclosure.

Referring now to FIG. 1A, a functional block diagram of an example hybrid vehicle system 100 is presented. The hybrid vehicle system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

While the engine 102 will be described as operating using a four-stroke cycle, the engine 102 may additionally or alternatively operate using another suitable combustion cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio or a desired equivalence ratio (EQR). An EQR may refer to a ratio of an air/fuel mixture to a stoichiometric air/fuel mixture.

Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between when the piston reaches TDC and the time when the piston reaches bottom dead center (BDC).

Figure 1B:
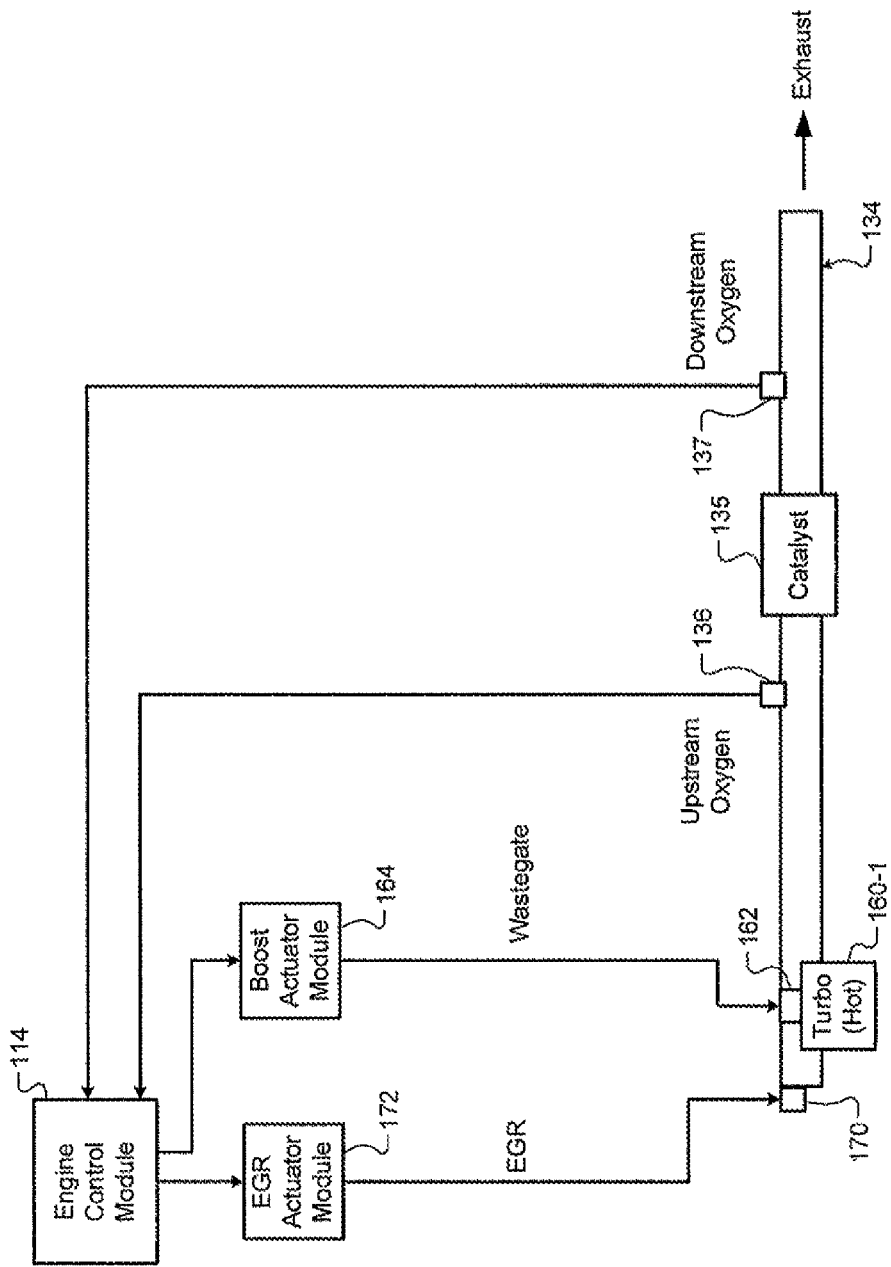

During the exhaust stroke, the piston begins moving up from BDC and expels the byproducts of combustion through an exhaust valve 130. The byproducts of combustion are exhausted from the vehicle via an exhaust system 134. As illustrated in FIG. 1B, a catalyst 135 receives exhaust output by the engine 102. The catalyst 135 may include, for example, a three-way catalyst, a four-way catalyst, an oxidation catalyst, or another suitable type of catalyst that stores oxygen. An amount (e.g., concentration) of oxygen upstream of the catalyst 135 is measured by an upstream oxygen sensor 136. An amount (e.g., concentration) of oxygen downstream of the catalyst 135 is measured by a downstream oxygen sensor 137.

Opening and closing of the intake valve 122 may be controlled by an intake camshaft 140, while opening and closing of the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (VVL), variable valve actuation (VVA), or fully flexible valve actuation (FFVA) may be controlled by the phaser actuator module 158.

The hybrid vehicle system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. The turbocharger may have variable geometry, which may be controlled by the boost actuator module 164. In various implementations, multiple boost devices may be included and may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The hybrid vehicle system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

A rotational speed of the crankshaft in revolutions per minute (RPM) may be measured using an RPM sensor 180. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor a position of the throttle valve 112 using one or more throttle position sensors (TPS) 190. A temperature of ambient air may be measured using an intake air temperature (IAT) sensor 192. One or more other sensors may also be implemented, such as exhaust temperature sensors, nitrogen oxide sensors, and other sensors. Signals from the sensors may be used to make control decisions for the hybrid vehicle system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. While only the electric motor 198 is shown and will be discussed, more than one electric motor may be implemented in various implementations.

The electric motor 198 may be controlled to function as a motor to generate torque for propulsion of the vehicle. The electric motor 198 may also be controlled to function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to TDC. Other actuators may include the cylinder actuator module 120, the fuel actuator module 124, the phaser actuator module 158, the boost actuator module 164, and the EGR actuator module 172. For these actuators, the actuator values may correspond to a number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
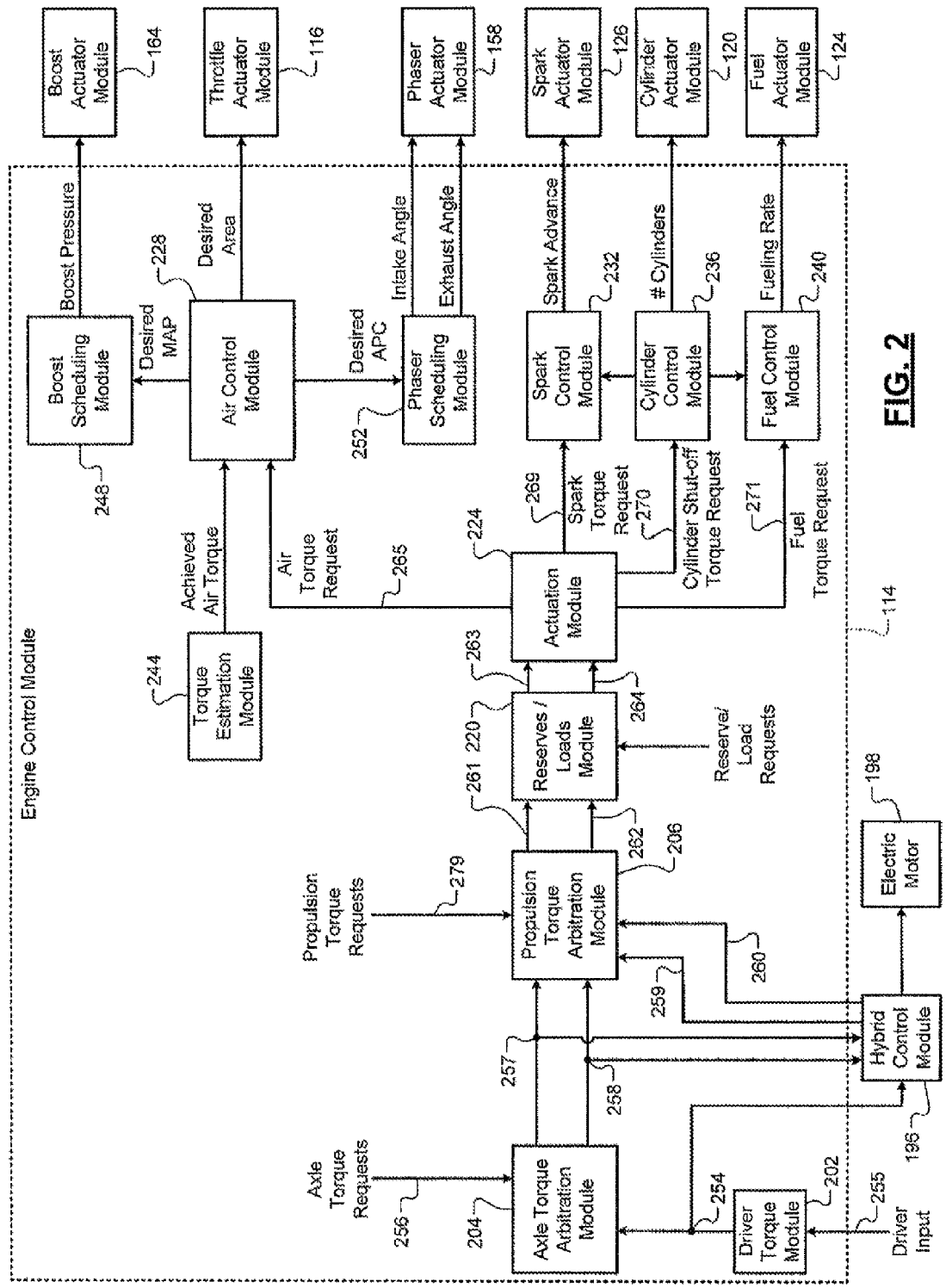
FIG. 2 is a functional block diagram of an example engine control system according to the principles of the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 also includes a reserves/loads module 220, an actuation module 224, an air control module 228, a spark control module 232, a cylinder control module 236, and a fuel control module 240. The ECM 114 also includes a torque estimation module 244, a boost scheduling module 248, and a phaser scheduling module 252.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings that relate the driver input 255 to torque and may determine the driver torque request 254 using a selected one of the mappings.

An axle torque arbitration module 204 arbitrates between the driver torque request 254 and other axle torque requests 256. Axle torque (torque at the wheels) may be produced by various sources including an engine and/or an electric motor. Generally, torque requests may include absolute torque requests as well as relative torque requests and ramp requests. For example only, ramp requests may include a request to ramp torque down to a minimum engine running torque or to ramp torque up from the minimum engine running torque. Relative torque requests may include temporary or persistent torque reductions or increases.

The axle torque requests 256 may include, for example, a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted (axle) torque request 257 and an immediate (axle) torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control actuators.

In general terms, the immediate torque request 258 is the amount of currently desired axle torque, while the predicted torque request 257 is the amount of axle torque that may be needed on short notice. The ECM 114 controls the engine actuators to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be set based on the driver torque request 254. The immediate torque request 258 may be less than the predicted torque request 257, such as when the driver torque request 254 is causing wheel slip on an icy surface. In such a case, a traction control system (not shown) may request a reduction via the immediate torque request 258, and the ECM 114 reduces torque production to the immediate torque request 258. However, the ECM 114 controls the engine actuators so that the engine 102 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine 102 can begin to produce with minimal delay. Fast engine actuators are used to quickly increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine 102 to produce the predicted torque request 257 if the fast actuators were set to appropriate values. Meanwhile, the ECM 114 may set actuator values for fast actuators to values that, given the slow actuator values, cause the engine 102 to achieve the immediate torque request 258 instead of the predicted torque request 257.

The fast actuator values therefore cause the engine 102 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine 102 is able to produce the predicted torque request 257 after only the delay imposed by the fast actuators. In other words, the longer delay that would otherwise result from changing axle torque using slow actuators is avoided.

For example only, when the predicted torque request 257 is equal to the driver torque request 254, a torque reserve may be created when the immediate torque request 258 is less than the driver torque request 254 due to a temporary torque reduction request. Alternatively, a torque reserve may be created by increasing the predicted torque request 257 above the driver torque request 254 while maintaining the immediate torque request 258 at the driver torque request 254. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to an optimum value, a maximum amount of torque may be produced in the combustion stroke immediately following the firing event. However, a spark advance deviating from the optimum value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the optimum value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to an optimum value, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 164 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid control module 196. While the hybrid control module 196 is shown as being implemented externally to the ECM 114, the hybrid control module 196 may be integrated within the ECM 114 in various hybrid vehicle systems.

The hybrid control module 196 may determine how much torque should be produced by the engine 102 and how much torque should be produced by the electric motor 198. The hybrid control module 196 outputs hybrid predicted and immediate torque requests 259 and 260, respectively, to the propulsion torque arbitration module 206.

The predicted and immediate torque requests received by the propulsion torque arbitration module 206 are converted from an axle torque domain (torque at the wheels) into a propulsion torque domain (torque at the crankshaft). The propulsion torque arbitration module 206 arbitrates between propulsion torque requests 279, including the converted predicted and immediate torque requests. The propulsion torque arbitration module 206 generates an arbitrated predicted (propulsion) torque request 261 and an arbitrated immediate (propulsion) torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

The propulsion torque requests 279 may include propulsion torque reductions for engine over-speed protection, torque increases for stall prevention, and torque reductions requested by the transmission control module 194 to accommodate gear shifts. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark advance. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (NC) compressor clutch. The reserve for engagement of the NC compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other (e.g., fast) actuators.

The air control module 228 may determine desired actuator values based on the air torque request 265. For example only, the air control module 228 may determine a desired manifold absolute pressure (MAP), a desired throttle area, and/or a desired air per cylinder (APC) based on the air torque request 265. The desired MAP may be used to determine a desired boost, and the desired APC may be used to determine desired cam phaser positions and a desired throttle area. In various implementations, the air control module 228 may also determine an amount of opening of the EGR valve 170 based on the air torque request 265.

The torque estimation module 244 may determine an achieved torque output of the engine 102. The achieved torque output of the engine 102 under the current operating conditions may be called an achieved air torque. The achieved air torque may be used by the air control module 228 to perform closed-loop control of one or more engine air flow parameters, such as throttle area, MAP, and phaser positions. For example, an APC to torque relationship such as $$T = f(APC, S, I, E, AF, OT, \#) \quad (1)$$

may be defined, where torque (T) is the achieved air torque and is a function of air per cylinder (APC), spark timing (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. The APC to torque relationship may be modeled by an equation and/or may be stored as a lookup table. The intake and exhaust cam phaser positions used may be based on actual positions, as the phasers may be traveling toward desired positions. The actual spark advance may be used to determine the achieved air torque.

The air control module 228 may determine the desired throttle area based on the air torque request. The air control module 228 may output the desired throttle area to the throttle actuator module 116. The throttle actuator module 116 then regulates the throttle valve 112 to produce the desired throttle area.

The air control module 228 may output the desired MAP to the boost scheduling module 248. The boost scheduling module 248 uses the desired MAP to control the boost actuator module 164. The boost actuator module 164 then controls one or more turbochargers (e.g., the turbocharger including the turbine 160-1 and the compressor 160-2) and/or superchargers.

The air control module 228 outputs the desired APC to the phaser scheduling module 252. Based on the desired APC and the RPM signal, the phaser scheduling module 252 may control positions of the intake and/or exhaust cam phasers 148 and 150 using the phaser actuator module 158.

The actuation module 224 may also generate a spark torque request 269, a cylinder shut-off torque request 270, and a fuel torque request 271. The spark torque request 269 may be used by the spark control module 232 to determine how much to retard the spark timing (which reduces engine output torque) from an optimum spark timing.

The optimum spark timing may vary based on various engine operating conditions. For example only, a torque relationship may be inverted to solve for desired spark advance. For a given torque request ($T_{des}$), a desired spark advance ($S_{des}$) may be determined based on $$S_{des} = T^{-1}(T_{des}, APC, I, E, AF, OT, \#) \quad (2)$$

This relationship may be embodied as an equation and/or as a lookup table. The air/fuel ratio (AF) may be the actual air/fuel ratio, as reported by the fuel control module 240. The spark actuator module 126 controls spark timing based on the desired spark advance.

When the spark advance is set to the optimum spark timing, the resulting torque may be as close to a maximum best torque (MBT) as possible. MBT may refer to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The optimum spark timing may differ slightly from MBT spark timing because of, for example, fuel quality (such as when lower octane fuel is used) and environmental factors. The engine output torque at the optimum spark timing may therefore be less than MBT.

The fuel control module 240 may vary the amount of fuel provided to each cylinder based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount (e.g., mass) of air per cylinder (APC). The fuel control module 240 may instruct the fuel actuator module 124 via a fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request 271 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The cylinder shut-off torque request 270 may be used by the cylinder control module 236 to determine how many cylinders to deactivate when operation in a fuel economy (FE) mode is requested. The FE mode may include, for example only, an active fuel management (AFM) mode.

The cylinder control module 236 may instruct the cylinder actuator module 120 to deactivate one or more cylinders of the engine 102 when the AFM mode is commanded. The cylinder actuator module 120 may include a hydraulic system that selectively decouples intake and/or exhaust valves from the corresponding camshafts for one or more cylinders in order to deactivate those cylinders. For example only, the cylinder actuator module 120 may deactivate a predefined group of cylinders (e.g., half) jointly when the AFM mode is commanded.

The cylinder control module 236 may also instruct the fuel control module 240 to stop providing fuel for deactivated cylinders and may instruct the spark control module 232 to stop providing spark for deactivated cylinders when the AFM mode is commanded. The spark control module 232 and the fuel control module 240 may stop providing spark and fuel to a cylinder once an fuel/air mixture that is already present in the cylinder has been combusted.

Some vehicles may additionally or alternatively be capable of operating the engine 102 in a fuel cutoff (FCO) mode. For example only, operation in the FCO mode may be commanded during vehicle deceleration. Operation in the FCO mode commanded pursuant to vehicle deceleration may be referred to as deceleration fuel cutoff (DFCO). The hybrid control module 196 selectively commands FCO operation for DFCO. For another example only, one or more transitions to and/or from operation in the FCO mode may also be commanded for determining whether one or more faults are present in one or more components based response(s) of one or more parameters to the one or more transitions.

In contrast with operation of the engine 102 in the AFM mode, one or more cylinders may be deactivated by halting provision of fuel to those cylinders when the FCO mode is commanded, without stopping the opening and closing of the intake and exhaust valves. In this manner, air flows through the engine 102 during operation in the FCO mode.

Figure 3:
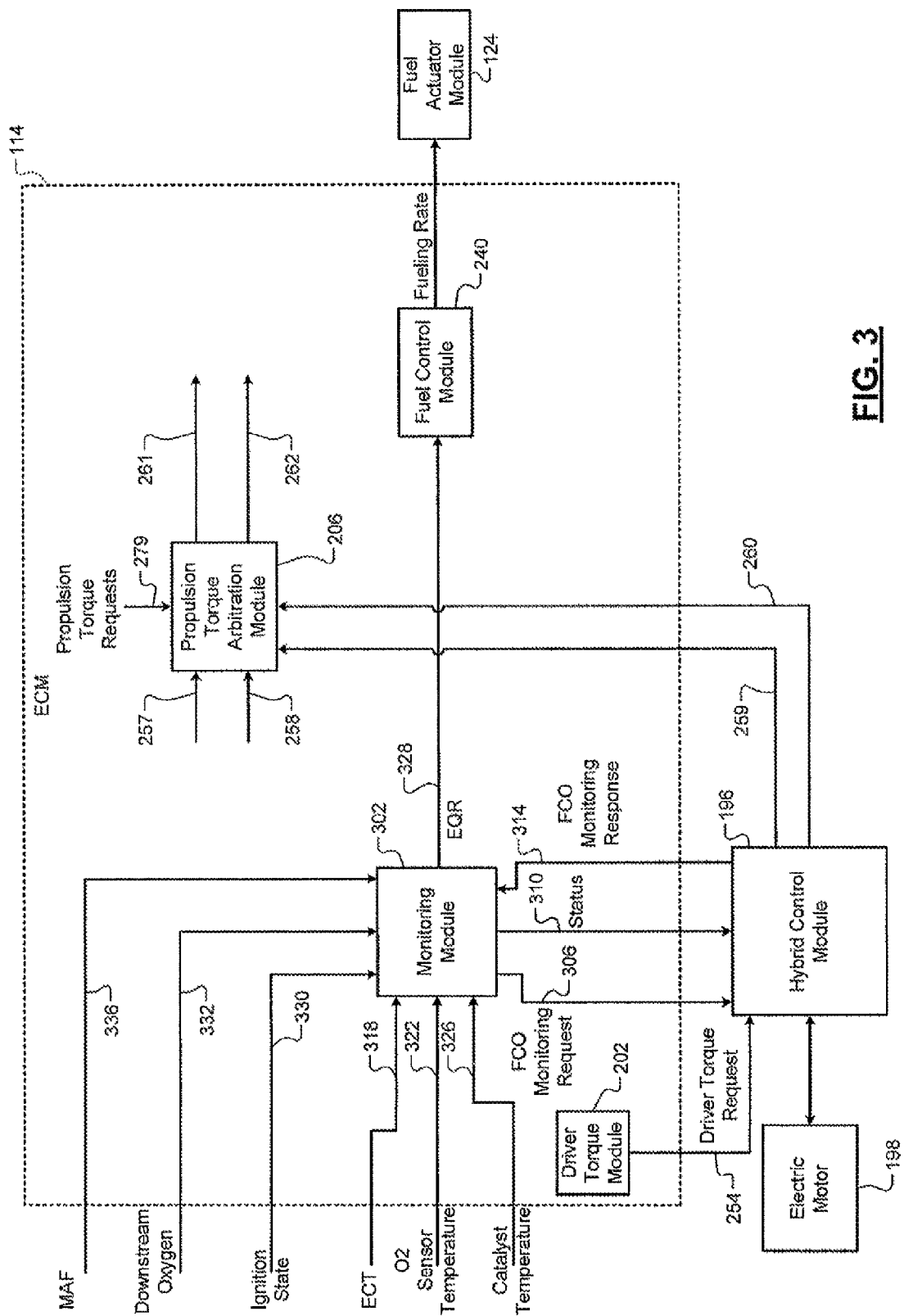
FIG. 3 is another functional block diagram of the engine control system according to the principles of the present disclosure.

FIG. 3 includes another functional block diagram of the example engine control system. Referring now to FIGS. 2 and 3, the ECM 114 may also include a monitoring module 302. One or more modules may determine whether one or more faults are present in one or more components based on responses to one or more transitions of fueling from fuel rich to fuel lean and/or a transition from fuel lean to fuel rich. A fuel rich to fuel lean transition may be accomplished by transitioning from rich fueling of the engine 102 to operating the engine 102 in the FCO mode. A transition from fuel lean to fuel rich may be accomplished by transitioning operation of the engine 102 from FCO operation to fuel rich fueling.

For example only, as described above, the catalyst 135 selectively stores oxygen. The monitoring module 302 may selectively transition operation of the engine 102 from fuel rich fueling to FCO operation and/or from FCO operation to fuel rich fueling in order to determine the catalyst's 135 ability to store oxygen. The monitoring module 302 may indicate whether a fault is present in the catalyst 135 based on the catalyst's 135 ability to store oxygen.

An oxygen storage capacity (OSC) period may be indicative of the catalyst's 135 ability to store oxygen. The monitoring module 302 may determine the OSC period for the catalyst 135 based on responses of the upstream and downstream oxygen sensors 136 and 137 to a change in fueling. More specifically, the monitoring module 302 may determine the OSC period for the catalyst 135 based on a period between a first time when the upstream oxygen sensor 136 responds to a transition from fuel rich fueling to FCO operation and a second time when the downstream oxygen sensor 137 responds to the transition. Additionally or alternatively, the OSC period for the catalyst 135 may be determined based on a period between a third time when the upstream oxygen sensor 136 responds to a transition from FCO operation to fuel rich fueling and a fourth time when the downstream oxygen sensor 137 responds to the transition.

When the OSC period is greater than a predetermined period, the monitoring module 302 may determine and indicate that the fault is not present in the catalyst 135. Conversely, the monitoring module 302 may determine and indicate that the fault is present in the catalyst 135 when the OSC period is less than the predetermined period.

The monitoring module 302 may command one or more transitions to and/or from FCO operation to determine whether a fault is present in the upstream oxygen sensor 136 and/or whether a fault is present in the downstream oxygen sensor 137. For example, the monitoring module 302 may monitor a response of the upstream oxygen sensor 136 to a transition from fuel rich to FCO operation and/or a transition from FCO operation to fuel rich. The monitoring module 302 may determine whether a fault is present in the upstream oxygen sensor 136 based on the response to the one or more transitions.

The monitoring module 302 may additionally or alternatively monitor a response of the downstream oxygen sensor 137 to a transition from fuel rich to FCO operation and/or a transition from FCO operation to fuel rich. The monitoring module 302 may determine whether a fault is present in the downstream oxygen sensor 137 based on the response to the one or more transitions. In various implementations, the same one or more transitions to and/or from FCO operation may be used to determine whether a fault is present in the catalyst 135, whether a fault is present in the upstream oxygen sensor 136, and/or whether a fault is present in the downstream oxygen sensor 137. The monitoring module 302 may determine whether a fault is present in one or more other components of a vehicle based on one or more responses to one or more commanded transitions to and/or from FCO operation.

The monitoring module 302 may generate one or more indicators when one or more faults are present. For example only, when a fault is detected in a component, the monitoring module 302 may set a predetermined diagnostic trouble code (DTC) in memory (not shown) associated with the fault. The monitoring module 302 may also illuminate a malfunction indicator lamp (not shown) and/or take one or more other remedial actions when one or more faults are present.

Commanded transitions to and from FCO operation for determining whether a fault is present, however, should be coordinated with operation of the hybrid control module 196.

Accordingly, the monitoring module 302 and the hybrid control module 196 take part in a request/response exchange in conjunction with the monitoring module 302 transitioning operation of the engine 102 to and/or from FCO operation for determining whether a fault is present. While determining whether a fault is present in the downstream oxygen sensor 137 will be discussed, the present application is also applicable to determining whether other faults are present.

The monitoring module 302 transmits a FCO monitoring request 306 to the hybrid control module 196. The monitoring module 302 also transmits a status 310 to the hybrid control module 196. The hybrid control module 196 transmits a FCO monitoring response 314 to the monitoring module 302.

At a given time, the monitoring module 302 sets a state of the FCO monitoring request 306 to one of an inactive state and an active state. The monitoring module 302 may set the FCO monitoring request 306 to the inactive state by default. The monitoring module 302 may transition the FCO monitoring request 306 to the active state when one or more request enabling conditions are satisfied during a present drive cycle of the vehicle.

For example only, the monitoring module 302 may transition the FCO monitoring request 306 to the active state when an ECT 318 is greater than a first predetermined temperature, an oxygen sensor temperature 322 is greater than a second predetermined temperature, and/or a catalyst temperature 326 is greater than a third predetermined temperature. The first, second, and third predetermined temperatures may be calibratable and may be set, for example, to approximately 60° Celcius (° C.), approximately 500° C., and approximately 500° C., respectively.

A drive cycle may refer to a period between a first time the vehicle is started and a second time when the control modules of the vehicle are later powered off. Startup of the vehicle may be indicated by an ignition state 330, and the ignition state 330 may be generated based on driver inputs via an ignition key, switch, button, etc. The monitoring module 302 may maintain the FCO monitoring request 306 in the active state until the vehicle is shut down (e.g., as indicated by the ignition state 330) or the determination of whether the fault is present is complete for the present drive cycle.

The state of the FCO monitoring request 306 indicates whether the monitoring module 302 is ready (and requesting) to perform the one or more transitions to and/or from FCO operation for determining whether the fault is present. However, the monitoring module 302 does not wait until the fuel is cut off, airflow conditions are within a predetermined range, and/or the accelerator pedal position is less than a predetermined value to transition the FCO monitoring request 306 to the active state to request performance of the one or more transitions. This is because the monitoring module 302 does not have enough information to decide whether the operating conditions are suitable for operation of the engine 102 in FCO mode for the determination of whether the fault is present.

The hybrid control module 196 instead determines whether the operating conditions are suitable for operation of the engine 102 in FCO mode for the determination whether the fault is present. The hybrid control module 196 indicates whether the requested FCO operation of the engine 102 can be performed via the FCO monitoring response 314.

At a given time, the hybrid control module 196 sets a state of the FCO monitoring response 314 to one of an inactive state and an active state. The hybrid control module 196 may set the FCO monitoring response 314 to the inactive state by default.

In response to the FCO monitoring request 306 being in the active state the hybrid control module 196 may selectively transition the FCO monitoring response 314 to the active state when one or more response enabling conditions are satisfied. The hybrid control module 196 may determine whether to transition the FCO monitoring response 314 to the active state based on the driver torque request 254. The hybrid control module 196 may transition the FCO monitoring response 314 to the active state when the driver torque request 254 can be satisfied via only the electric motor 198 (and other electric motor(s) if present) while the engine 102 is being spun during the period of FCO operation. For example only, the hybrid control module 196 may transition the FCO monitoring response 314 to the active state when the driver torque request 254 is less than an available motor torque. The available motor torque may correspond to an amount of torque that the electric motor(s) is/are capable of achieving under the present conditions. The available motor torque may be determined, for example, based on energy of a battery, a temperature of the battery, a vehicle speed, and/or one or more other suitable parameters.

When the FCO monitoring response 314 is in the active state, the hybrid control module 196 adjusts the hybrid predicted torque request 259 toward the minimum engine running torque at up to a predetermined amount per predetermined period. In other words, the hybrid control module 196 may ramp the hybrid predicted torque request 259 down to the minimum engine running torque at a predetermined rate. The minimum engine running torque may refer to a minimum torque where the engine 102 will remain running with proper combustion.

The reduction in the hybrid predicted torque request 259 causes airflow through the engine 102 to be reduced to correspond to the minimum engine running torque. The monitoring module 302 may increase the minimum engine running torque (so the hybrid control module 196 correspondingly increases the adjusted predicted torque request 269) from a calibrated value, for example, when more airflow through the engine 102 is needed for the determination of whether the fault is present.

At a given time, the monitoring module 302 may set the status 310 to one of an inactive state, a pre-FCO inhibit state, a FCO state, and a post-FCO inhibit state. The monitoring module 302 may set the status to the inactive state by default. In response to the FCO monitoring response 314 transitioning to the active state, the monitoring module 302 may set an EQR command 328 to a fuel rich EQR. The fuel control module 240 provides rich fueling to the engine 102 in response to the EQR command 328 being set to the fuel rich EQR.

In response to the FCO monitoring response 314 transitioning to the active state, the monitoring module 302 transitions the status 310 to the pre-FCO inhibit state. The pre-FCO inhibit state indicates that, while the hybrid control module 196 has indicated that FCO operation for the determination of whether the fault is present can be performed, the monitoring module 302 is inhibiting performance of the one or more transitions to and/or from FCO operation.

The monitoring module 302 may begin monitoring the one or more parameters to be monitored to determine whether the fault is present in response to the FCO monitoring response 314 transitioning to the active state. For example, in conjunction with determining whether the fault is present in the downstream oxygen sensor 137, the monitoring module 302 may begin monitoring a downstream oxygen amount 332 measured using the downstream oxygen sensor 137.

When the FCO monitoring response 314 is in the active state, the monitoring module 302 transition to FCO operation of the engine 102 when one or more FCO enabling conditions are satisfied. For example only, the monitoring module 302 may transition to FCO operation when airflow through the engine 102 is within a predetermined range and fueling is rich. Airflow through the engine 102 may be indicated, for example, by the APC, a MAF 336 measured using the MAF sensor 186, and/or one or more other suitable parameters that are indicative of airflow through the engine 102. Fuel rich fueling may be indicated, for example, by the downstream oxygen amount 332 measured using the downstream oxygen sensor 137 and/or the upstream oxygen amount (not shown) measured using the upstream oxygen sensor 136 being fuel rich. The transition to FCO operation may be accomplished, for example, by setting the EQR command 328 to zero or in another suitable manner.

The monitoring module 302 transitions the status 310 from the pre-FCO inhibit state to the FCO state when the one or more FCO enabling conditions are satisfied and FCO operation is being performed. In response to the status 310 transitioning to the FCO state, the hybrid control module 196 adjusts the hybrid immediate torque request 260 toward a minimum engine off torque at up to a predetermined amount per predetermined period. In other words, the hybrid control module 196 may ramp the hybrid immediate torque request 260 down to the minimum engine off torque at a predetermined rate. The minimum engine off torque may be a (propulsion) torque with the crankshaft spinning during FCO operation. The minimum engine off torque may be a predetermined value. The monitoring module 302 may continue to monitor the one or more parameters to be monitored to determine whether the fault is present while the status 310 is in the FCO state.

When the status 310 is in the FCO state, the monitoring module 302 determines whether to transition from FCO operation to fueling the engine 102. The monitoring module 302 may determine whether to transition to fueling the engine 102, for example, when FCO operation has been performed for a predetermined period or when a transition of the downstream oxygen amount 332 from fuel rich to fuel lean is observed.

The monitoring module 302 may transition the status 310 from the FCO state to the post-FCO inhibit state in response to a determination to transition from FCO operation to fueling the engine 102. When the status 310 is set to the post-FCO inhibit state, the hybrid control module 196 may selectively transition the FCO monitoring response 314 to the inactive state. The hybrid control module 196 may transition the EGO monitoring response 314 from the active state to the inactive state, for example, when the hybrid control module 196 determines that the engine 102 can be fueled. The hybrid control module 196 may determine that the engine 102 can be fueled, for example, based on the driver torque request 254.

In response to the EGO monitoring response 314 transitioning from the active state to the inactive state, the monitoring module 302 may transition from FCO operation to fueling the engine 102. The monitoring module 302 may transition to fueling the engine 102, for example, by adjusting the EQR command 328 or in another suitable manner. The monitoring module 302 may, for example, set the EQR command 328 for monitoring a transition from FCO operation to fuel rich fueling.

When the status 310 is set to the post-FCO inhibit state and the FCO monitoring response 314 is in the inactive state, the hybrid control module 196 should continue to generate the hybrid predicted and immediate torque requests 259 and 260 to create conditions suitable for the determination of whether the fault is present. In the case of determining whether a fault is present in the downstream oxygen sensor 137, for example, the hybrid control module 196 may hold airflow based on the minimum engine running torque and fueling may be allowed. The hybrid control module 196, however, may determine that the engine torque output cannot be maintained at the minimum engine running torque and increase the hybrid predicted torque request 259 (relative to the minimum engine running torque). The hybrid control module 196 may determine whether the minimum engine running torque can be maintained, for example, based on the driver torque request 254.

After the transition from FCO operation to fueling the engine 102, the monitoring module 302 may monitor the airflow through the engine 102 until the determination of whether the fault is present is complete. The monitoring module 302 determines whether the fault is present based on the responses to the one or more transitions.

If the determination of whether the fault is present is complete, the monitoring module 302 may indicate whether the fault is present, and the monitoring module 302 may transition the FCO monitoring request 306 and the status 310 to the inactive states until a next drive cycle. If the airflow through the engine 102 becomes greater than the predetermined range before the completion of the determination of whether the fault is present, however, the monitoring module 302 may end the determination and attempt to perform the one or more transitions over.

After transitioning the FCO monitoring response 314 to the active state, the hybrid control module 196 can cancel the performance of the one or more transitions for the determination of whether the fault is present. Depending on the status 310, cancelling FCO operation can be preventing a transition from fueling to FCO operation (when the status 310 is in the inactive state or the pre-FCO inhibit state), disabling FCO operation (when the status 310 is in the FCO state), or disabling the monitoring module's 302 control of fueling (when the status 310 is in the post-FCO inhibit state).

The hybrid control module 196 may cancel FCO operation, for example, when the driver torque request 254 cannot be satisfied via the electric motor 198 (and other electric motor(s) if present). When the status 310 is in the inactive state, the pre-FCO inhibit state, or the FCO state, the hybrid control module 196 may cancel FCO operation for determining whether the fault is present by transitioning the FCO monitoring response 314 from the active state to the inactive state. When the status 310 is in the post-FCO inhibit state, the hybrid control module 196 may cancel fuel control for determining whether the fault is present by increasing the airflow through the engine 102 above the predetermined range.

Figure 4A:
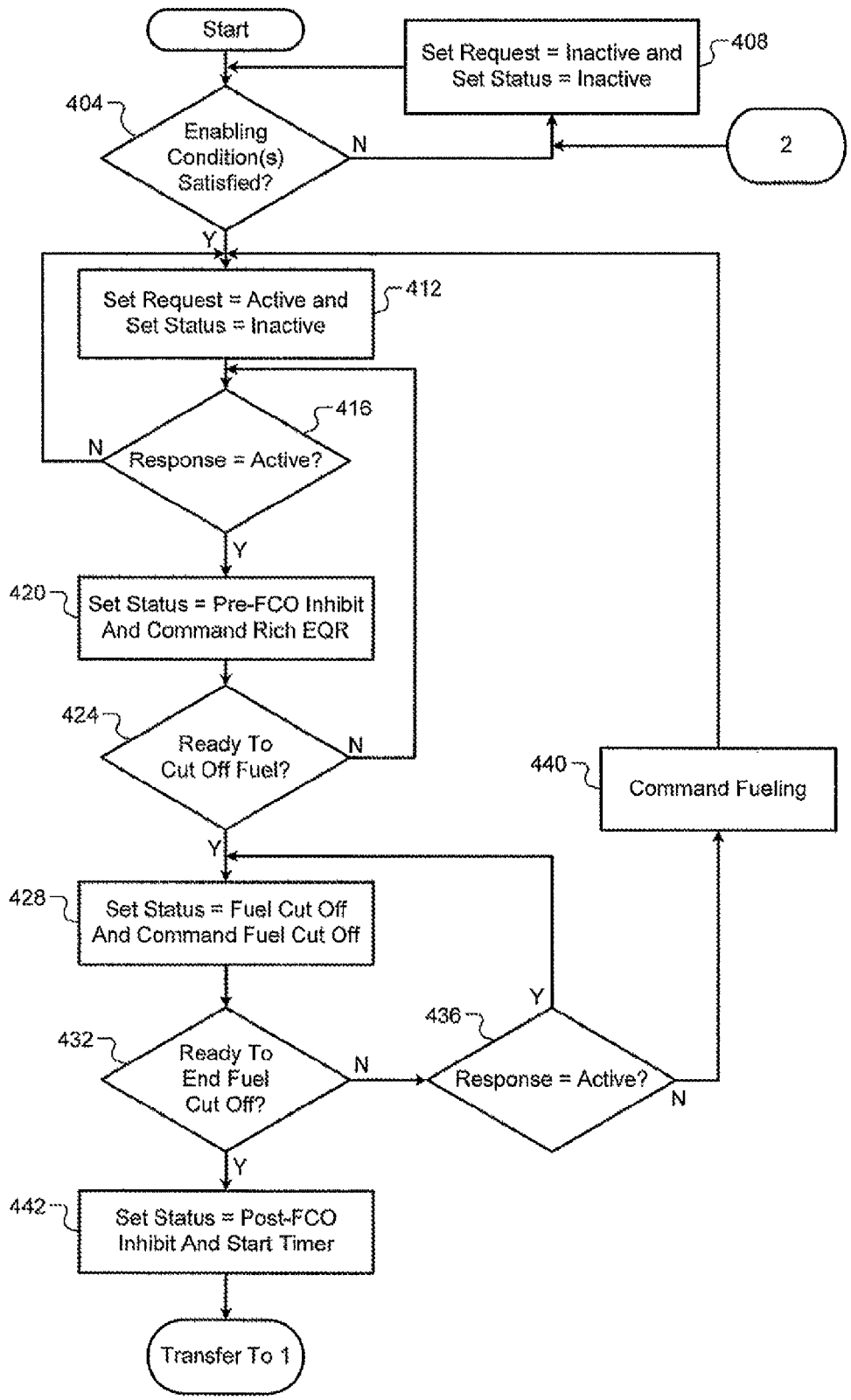
FIGS. 4A-4B include a flowchart depicting an example method of requesting and controlling performance of fuel cutoff according to the present disclosure.
Figure 4B:
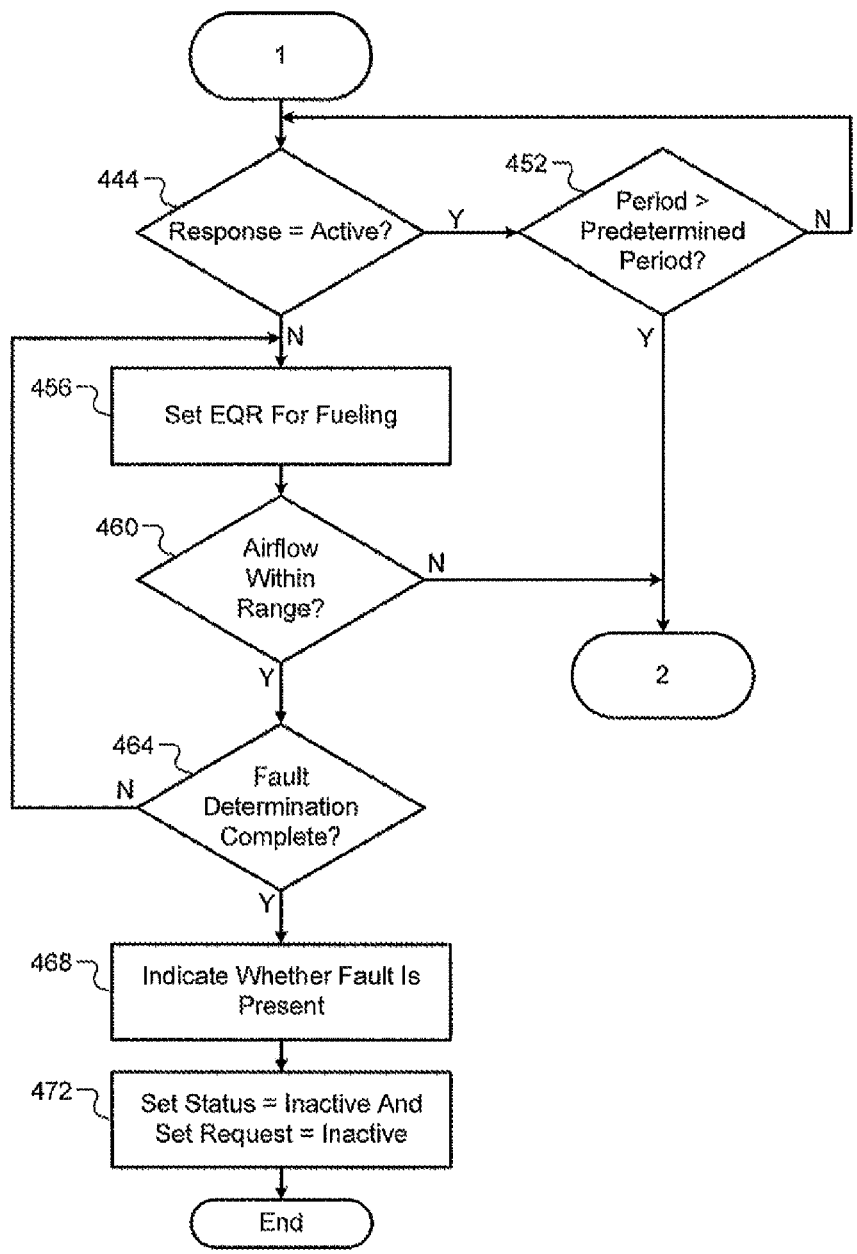

Referring now to FIGS. 4A-4B, a flowchart depicting an example method that may be performed by the monitoring module 302 for controlling FCO operation of the engine 102 is presented. The FCO monitoring request 306 and the status 310 may be set to the inactive states by default when control begins.

Control may begin with 404 where control determines whether the one or more enabling conditions are satisfied for performing one or more transitions to and/or from FCO operation of the engine 102 for determining whether the fault is present. If false, control may maintain the FCO monitoring request 306 and the status 310 in the inactive states at 408 and return to 404. If true, control may set the FCO monitoring request 306 to the active state at 412. Control may also set the status 310 to the inactive state at 412. In this manner, control indicates a request to perform the one or more transitions to and/or from FCO operation for determining whether the fault is present. The one or more request enabling conditions may be satisfied, for example, when the ECT 318 is greater than the first predetermined temperature, when the oxygen sensor temperature is greater than the second predetermined temperature, and/or when the catalyst temperature 326 is greater than the third predetermined temperature.

At 416, control determines whether the FCO monitoring response 314 from the hybrid control module 196 is in the active state. If true, control may continue with 420. If false, control may return to 412 and maintain the FCO monitoring request 306 in the active state and the status 310 in the inactive state. The hybrid control module 196 indicates, by setting the FCO monitoring response 314 to the active state, when the one or more transitions to and/or from FCO operation of the engine 102 can be performed.

When the FCO monitoring response 314 is set to the active state at 416, control may transition the status 310 to the pre-FCO inhibit state and set the EQR command 328 to a fuel rich EQR. Control may wait until the airflow is within the predetermined range before setting the EQR command 328 to the fuel rich EQR. Control indicates, by setting the status 310 to the pre-FCO inhibit state, that control is inhibiting a transition to FCO operation of the engine 102, for example, for providing fuel rich fueling before the transition to FCO operation.

At 424, control determines whether to transition from fueling the engine 102 to FCO operation of the engine 102. If true, control may proceed with 428. If false, control may return to 416. By returning to 416, control can avoid transitioning to FCO operation if the hybrid control module 196 cancels performance of the one or more transitions to and/or from FCO operation of the engine 102 (e.g., based on the driver torque request 254) by transitioning the FCO monitoring response 314 to the inactive state.

Control sets the status 310 to the FCO state and cuts off fuel to the engine 102 at 428. One or more responses to the transition from fueling the engine 102 to FCO operation of the engine 102 may be used to determine whether the fault is present. At 432, control may determine whether to end the FCO operation of the engine 102. If false, control may continue with 436; if true, control may continue with 442. Control may determine to end the FCO operation of the engine 102, for example, a predetermined period after beginning the FCO operation of the engine 102.

At 436, control determines whether the FCO monitoring response 314 is in the active state. If true, control may return to 428 and continue the FCO operation of the engine 102. If false, control may cancel the FCO operation and command fueling of the engine 102 at 440, and control may return to 412 to set the status 412 to the inactive state. In this manner, the hybrid control module 196 can cancel (disable) the FCO operation of the engine 102. Control can re-attempt one or more of the transitions to and/or from FCO operation of the engine 102 for determining whether the fault is present when the FCO monitoring response 314 transitions back to the active state.

When control determines to end the FCO operation of the engine 102 at 432, control sets the status 310 to the post-FCO inhibit state at 442. Control may also start a timer at 442. The timer therefore tracks the period elapsed since control determined and notified the hybrid control module 196 of the determination to end the FCO operation of the engine 102. Control may continue with 444.

At 444 (FIG. 4B), control determines whether the FCO monitoring response 314 is in the active state. If true, control may continue with 452; if false, control may continue with 456. At 452, control may determine whether the period (tracked by the timer) is greater than a predetermined period. If false, control may return to 444, and the period may continue to increase. If true, control may return to 408 (FIG. 4A).

In this manner, if the hybrid control module 196 does not transition the FCO monitoring response 314 from the active state to the inactive state within the predetermined period after being notified of the determination to end the FCO operation of the engine 102, control may start the method over.

At 456, in response to the FCO monitoring response 314 transitioning to the inactive state, control disables the FCO operation of the engine 102 and sets the EQR command 328 for fueling of the engine 102. Control may set the EQR command 328 for fuel rich fueling at 456, for example, for monitoring a transition from the FCO operation to fuel rich operation. One or more responses to the transition from the FCO operation to the fuel rich operation may be used to determine whether the fault is present.

At 460, control may determine whether the airflow is within the predetermined range. If true, control may continue with 464. If false, control may return to 408 (FIG. 4A). In this manner, if the hybrid control module 196 increases airflow (e.g., to achieve the driver torque request 254), control may start the method over.

At 464, control may determine whether the determination of whether the fault is present is complete. If true, control may indicate whether the fault is present at 468 and continue with 472. If false, control may return to 456 and maintain continue with the fueling for the determination of whether the fault is present. Control may set the status 310 to the inactive state and the FCO monitoring request 306 to the inactive state at 472, and control may end. Control may perform the method once per drive cycle or at another suitable frequency.

Figure 5:
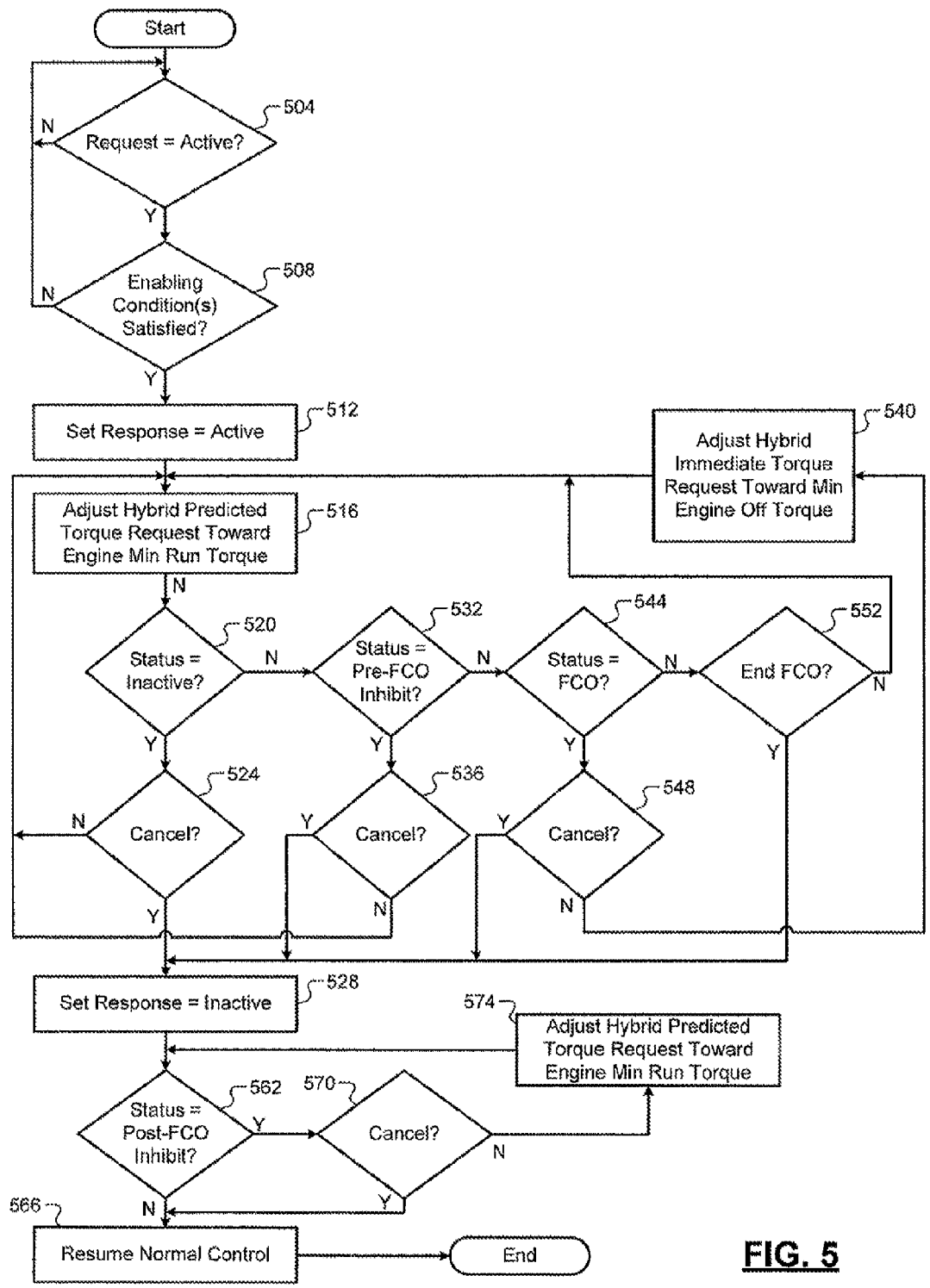
FIG. 5 includes a flowchart depicting an example method of responding to the request for and controlling performance of the fuel cutoff according to the present disclosure.

Referring now to FIG. 5, a flowchart depicting an example method that may be performed by the hybrid control module 196 for controlling FCO operation of the engine 102 is presented. The FCO monitoring response 314 may be set to the inactive states by default when control begins.

Control may begin with 504 where control determines whether the FCO monitoring request 306 is in the active state. If true, control may continue with 508. If false, control may remain at 504. At 508, control may determine whether one or more response enabling conditions are satisfied. If true, control may continue with 512. If false, control may remain at 504. For example, the one or more response enabling conditions may be satisfied when the driver axle torque request 254 can be satisfied using only the electric motor(s) of the vehicle.

At 512, control sets the FCO monitoring response 314 to the active state. In this manner, control notifies the monitoring module 302 that the one or more transitions to and/or from FCO operation can be performed for the determination of whether the fault is present. At 516, control adjusts the hybrid predicted torque request 259 toward the minimum engine running torque by up to a predetermined amount. This ramps the hybrid predicted torque request 259 (generally down) toward the minimum engine running torque. Airflow through the engine 102 is adjusted for the determination of whether the fault is present while the crankshaft remains rotating (i.e., the engine 102 remains spinning).

Control determines whether the status 310 is in the inactive state at 520. If true, control continues with 524. If false, control transfers to 532, which is discussed further below. At 524, control determines whether to cancel the one or more transitions to and/or from FCO operation of the engine 102. If false, control may return to 516. If true, control may transition the FCO monitoring response 314 to the inactive state to cancel (prevent) the one or more transitions to and/or from FCO operation of the engine 102 at 528. After 528, control continues with 562, which is discussed further below.

At 532, control may determine whether the status 310 is in the pre-FCO inhibit state. If true, the monitoring module 302 is preparing to transition to FCO operation, and control may continue with 536. If false, control may transfer to 544, which is discussed further below.

Control may determine whether to cancel the one or more transitions to and/or from FCO operation of the engine 102 at 536. If true, control may transition the FCO monitoring response 314 to the inactive state to cancel (prevent) the one or more transitions to and/or from FCO operation of the engine 102 at 528, and control may continue with 562. If false, control may return to 516.

At 544, control determines whether the status 310 is in the FCO state. If true, the monitoring module 302 is cutting off fuel to the engine 102, and control may continue with 548. If false, control may transfer to 552, which is discussed further below. At 548, control may determine whether to cancel the one or more transitions to and/or from FCO operation of the engine 102. If true, control may transition the FCO monitoring response 314 to the inactive state to cancel (disable) the (presently occurring) FCO operation of the engine 102 at 528, and control may continue with 562. In response to the transitioning of the FCO monitoring response 314 to the inactive state, fueling to the engine 102 is performed. If false, control may adjust the hybrid immediate torque request 260 toward the engine minimum off torque by up to the predetermined amount at 540 and return to 516.

At 552, the status 310 is in the post-FCO inhibit phase, and the monitoring module 302 is transitioning from the FCO operation of the engine 102 to fueling the engine 102 with the minimum airflow. Control determines whether to cancel the fueling of the engine 102 at 552. If true, control may transition the FCO monitoring response 314 to the inactive state to end the FCO operation at 528, and control may continue with 562.

At 562, control determines whether the status 310 is set to the post-FCO inhibit state. If false, control resumes normal control of the engine 102 and the electric motor(s) at 566, and control may end. While control is shown and discussed as ending, control may instead return to 504. If true, control may continue with 570. Control may determine whether to cancel the operation of the engine 102 based on the minimum engine running torque at 570. If true, control resumes normal control of the engine 102 and the electric motor(s) at 566, and control may end. Normal control may allow the hybrid control module 196 to increase the airflow, which if the fault determination is not already complete, may cause the monitoring module 302 begin the method of FIGS. 4A and 4B over. If false, control adjusts the hybrid predicted torque request 259 toward the engine minimum running torque to maintain the airflow low at 574 for determining whether the fault is present, and control may return to 562.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A control system for a hybrid vehicle, the control system comprising:
    a monitoring module that:
        selectively generates a request to at least one of:
            transition from providing rich fueling an engine to operating the engine in a fuel cutoff (FCO) state; and
            transition from operating the engine in the FCO state to providing rich fueling to the engine; and
        in response to a response to the request:
            selectively controls fueling to the engine to perform the at least one of the transitions; and
            selectively determines whether a fault is present in a component of the hybrid vehicle based on the response to the request of the at least one of the transitions; and
    a hybrid control module that controls an electric motor of the hybrid vehicle and that selectively generates the response,
    wherein the monitoring module generates the request when a catalyst temperature is greater than a first predetermined temperature.

2. The control system of claim 1 wherein the hybrid control module selectively generates the response based on a driver torque request and an available motor torque.

3. The control system of claim 1 wherein the monitoring module generates the request when an engine coolant temperature is greater than a second predetermined temperature.

4. The control system of claim 1 wherein the monitoring module generates the request when a temperature of an exhaust gas oxygen sensor is greater than a second predetermined temperature.

5. The control system of claim 1 wherein the monitoring module generates the request independently of airflow through the engine and an accelerator pedal position.

6. The control system of claim 1 wherein the monitoring module selectively determines whether the fault is present in an exhaust gas oxygen sensor based on a response of the exhaust gas oxygen sensor to the at least one of the transitions.

7. The control system of claim 6 wherein the exhaust gas oxygen sensor is located downstream of a three-way catalyst of an exhaust system.

8. The control system of claim 1 wherein the monitoring module selectively determines whether the fault is present in a three-way catalyst of an exhaust system based on at least one of:
   a response of a first exhaust gas oxygen sensor to the at least one of the transitions,
   wherein the first exhaust gas oxygen sensor is located upstream of the three-way catalyst in the exhaust system; and
   a response of a second exhaust gas oxygen sensor to the at least one of the transitions,
   wherein the second exhaust gas oxygen sensor is located downstream of the three-way catalyst in the exhaust system.

9. The control system of claim 1 wherein, after generating the response to the request, the hybrid control module selectively commands the monitoring module to cancel the performance of the at least one of the transitions based on a driver torque request and an available motor torque.

10. A control method for a hybrid vehicle, the control method comprising:
   selectively generating a request to at least one of:
      transition from providing rich fueling an engine to operating the engine in a fuel cutoff (FCO) state; and
      transition from operating the engine in the FCO state to providing rich fueling to the engine;
   in response to a response to the request:
      selectively controlling fueling to the engine to perform the at least one of the transitions; and
      selectively determining whether a fault is present in a component of the hybrid vehicle based on the response to the request of the at least one of the transitions;
   controlling an electric motor of the hybrid vehicle using a hybrid control module;
   selectively generating the response using the hybrid control module; and
   generating the request when a catalyst temperature is greater than a predetermined temperature.

11. The control method of claim 10 further comprising selectively generating the response, using the hybrid control module, based on a driver torque request and an available motor torque.

12. The control method of claim 10 further comprising generating the request when an engine coolant temperature is greater than a second predetermined temperature.

13. The control method of claim 10 further comprising generating the request when a temperature of an exhaust gas oxygen sensor is greater than a second predetermined temperature.

14. The control method of claim 10 further comprising generating the request independently of airflow through the engine and an accelerator pedal position.

15. The control method of claim 10 further comprising selectively determining whether the fault is present in an exhaust gas oxygen sensor based on a response of the exhaust gas oxygen sensor to the at least one of the transitions.

16. The control method of claim 15 wherein the exhaust gas oxygen sensor is located downstream of a three-way catalyst of an exhaust system.

17. The control method of claim 10 further comprising selectively determining whether the fault is present in a three-way catalyst of an exhaust system based on at least one of:
   a response of a first exhaust gas oxygen sensor to the at least one of the transitions,
   wherein the first exhaust gas oxygen sensor is located upstream of the three-way catalyst in the exhaust system; and
   a response of a second exhaust gas oxygen sensor to the at least one of the transitions,
   wherein the second exhaust gas oxygen sensor is located downstream of the three-way catalyst in the exhaust system.

18. The control method of claim 10 further comprising, after generating the response to the request, selectively commanding cancellation of the performance of the at least one of the transitions based on a driver torque request and an available motor torque.

19. A control system for a hybrid vehicle, the control system comprising:
   a monitoring module that:
      selectively generates a request to at least one of:
         transition from providing rich fueling an engine to operating the engine in a fuel cutoff (FCO) state; and
         transition from operating the engine in the FCO state to providing rich fueling to the engine; and
      in response to a response to the request:
         selectively controls fueling to the engine to perform the at least one of the transitions; and
         selectively determines whether a fault is present in a component of the hybrid vehicle based on the response to the request of the at least one of the transitions; and
   a hybrid control module that controls an electric motor of the hybrid vehicle and that selectively generates the response,
   wherein the monitoring module generates the request when a temperature of an exhaust gas oxygen sensor is greater than a predetermined temperature.

20. A control method for a hybrid vehicle, the control method comprising:
   selectively generating a request to at least one of:
      transition from providing rich fueling an engine to operating the engine in a fuel cutoff (FCO) state; and
      transition from operating the engine in the FCO state to providing rich fueling to the engine;
   in response to a response to the request:
      selectively controlling fueling to the engine to perform the at least one of the transitions; and
      selectively determining whether a fault is present in a component of the hybrid vehicle based on the response to the request of the at least one of the transitions;
   controlling an electric motor of the hybrid vehicle using a hybrid control module;
   selectively generating the response using the hybrid control module; and
   generating the request when a temperature of an exhaust gas oxygen sensor is greater than a predetermined temperature.

* * * * *